United States Patent

Garschagen et al.

[11] Patent Number: 5,899,645
[45] Date of Patent: May 4, 1999

[54] MACHINE TOOL FOR BEVELLING OF TOOTH FLANKS OF A GEAR

[75] Inventors: Friedrich Albert Garschagen, Remscheid; Hans-Udo Heym, Wuppertal, both of Germany

[73] Assignee: Wera Werk Hermann Werner GmbH & Co., Wuppertal, Germany

[21] Appl. No.: 09/051,214
[22] PCT Filed: Jul. 29, 1997
[86] PCT No.: PCT/EP97/04106
  § 371 Date: Apr. 3, 1998
  § 102(e) Date: Apr. 3, 1998
[87] PCT Pub. No.: WO98/05460
  PCT Pub. Date: Feb. 12, 1998

[30] Foreign Application Priority Data

Aug. 6, 1996 [DE] Germany .......................... 196 31 675

[51] Int. Cl.⁶ .................................................. B23F 19/10
[52] U.S. Cl. .................................................. 409/9; 451/900
[58] Field of Search .................................. 409/8, 9, 1, 58; 451/147, 219, 900

[56] References Cited

U.S. PATENT DOCUMENTS

| 1,960,536 | 5/1934 | Haas . |
| 3,728,902 | 4/1973 | McCaughey . |
| 4,726,720 | 2/1988 | Lieser ........................................... 409/9 |

FOREIGN PATENT DOCUMENTS

| 884269 | 7/1953 | Germany .................................. 409/8 |
| 2625804 | 6/1976 | Germany .................................. 409/8 |
| 3000295 | 7/1981 | Germany . |
| 3310000 | 9/1984 | Germany .................................. 409/8 |
| 4134925 | 11/1992 | Germany . |
| 1470028 | 4/1977 | United Kingdom . |

*Primary Examiner*—William Briggs
*Attorney, Agent, or Firm*—Martin A. Farber

[57] ABSTRACT

The invention concerns a machine tool for the bovelling of a gear, in which two topfaces are simultaneously milled, with a rotationally driven workpiece carrier and two rotationally driven mounting spindles (13) which can be placed on the workpiece in an axial direction and whose rotationally driven angle of orientation towards the workpiece axis is adjustable in order to receive a milling machine at any one time, especially face milling cutters or single-tooth fly cutters. The workpiece is alternatively clocked or rotationally driven in a continuous manner and the mounting spindles (13) can be moved on a forwards or backwards axis in synchronization with the workpiece cycle or in synchronization with the continuous rotation of the workpiece on a fixed axis. The workpiece is moved forwards in the direction of the axis and each mounting spindle (13) is provided with a slide (12), which can be moved by an axial displacement drive (15). In order to obtain short operation times quick, easy resetting of the machine tool during modification of the machining process the invention proposes that the tool feed should be determined during the machining process by the form of a replaceable axial radial cam (17), which is rotationally driven by an axial displacement drive (15) and whose stroke corresponds at least to the machining section, in which both flanks (20) of the axial radial cam (17) are placed between the jockey rollers (21) of the slide (12), free from backlash.

6 Claims, 8 Drawing Sheets

MACHINE TOOL FOR BEVELLING OF TOOTH FLANKS OF A GEAR

FIELD AND BACKGROUND OF THE INVENTION

The invention relates to a machine tool for sloping the tooth flanks of a gear, with two flanks being milled simultaneously, with a rotationally driven workpiece holder and with two rotationally driven tool spindles adjustable relative to the workpiece along their axes, with the angular alignment relative to the workpiece axis being adjustable for each to receive a milling cutter, especially a face milling cutter or a one-tooth fly cutter, with the workpiece optionally being rotationally driven cyclically or continuously, the tool spindles being correspondingly displaceable forward and backward axially in synchronization with the workpiece cycle, or rotating, fixed axially, in synchronization with the continuous workpiece rotation, with the workpiece being advanced in the axial direction and with each tool spindle having a carriage associated therewith, said carriage being displaceable by an axial displacement drive.

A machine tool of the this type under discussion is known from DE 41 34 925 C1, with the tool spindles received by a carriage being moved back and forth by means of an oscillator at a very rapid sequence of 1200 or more strokes per minute, in synchronization with the rotation of the workpiece. Continuous adjustment of the tool spindles in the direction of the workpiece in order to produce the slopes is superimposed on this. Accordingly, two separate movements take place along the tool spindle axes, namely the oscillating movement and the actual advance displacement that makes the design of such a machine tool more expensive. This document shows that the workpiece can also be indexed one division at a time when impact milling operation is desired, which corresponds to cyclic operation. In this case also, the actual tool feed would be superimposed on the oscillating movement of the tool spindle.

SUMMARY OF THE INVENTION

It is an object of the invention to develop a machine tool according to the species with a simple construction such that short machining times can be achieved particularly when forming slopes on tooth flanks in a cyclic method and the machine tool can be converted rapidly and easily when changing the machining method.

According to the invention, tool feed during chip removal is determined by the shape of an axial radial cam that is replaceable and is rotationally driven by the axial displacement drive, with the stroke of this cam corresponding to at least the chip removal distance and, with the two flanks of the axial radial cam being located with zero play between sensing rollers of the carriage.

As a result of such a development of The Invention, a machine tool according to the introductory-mentioned type is created that has a simple design and which firstly permits the production of slopes on tooth flanks in known fashion by the rotary method. The axial displacement drive does not operate at this time, so that the tool spindle and workpiece turn in synchronization with the workpiece spindle as it advances. If it is desired to slope the tooth flanks of a gear using the cyclic method, during the chip removal process the tool or tool spindle performs the advance movement. This is accomplished by means of the axial displacement drive, with its rotationally driven axial radial cam, which is easily and rapidly replaceable, determining the amount of tool feed during the chip removal process. No additional feed movement is superimposed as in the prior art. For example, if the stroke produced by the axial radial cam is approximately 5 mm, approximately 240 strokes per minute can be used when producing slopes, in other words a value that cannot be achieved using tool spindle supports that are moved back and forth hydraulically. This high number of strokes therefore produces the shortest machining times in the cyclic process, together with precise machining results. The flanks of the axial radial cam that are located with zero play between the sensing rollers of the carriage produce optimum adjustment and movement of the tool carried by the tool spindle. The fact that the axial radial cam is replaceable thus allows the quality of the workpiece to be varied. This replacement ability is advantageous if the machine tool is to be converted to rotary machining. The axial radial cam can be removed and the carriage locked in its forward or backward displacement position by means of a wedge to prevent axial displacement. Conversion to cyclic machining then requires removing the wedge and inserting a suitable axial radial cam. The rotary drive motors for the tool spindles can be connected coaxially to said spindles and linked for example by a spline shaft coupling. In addition, the flanks that form the cams are designed so that the tool spindles are moved backward faster than they are advanced.

BRIEF DESCRIPTION OF THE DRAWINGS

With the above and other objects and advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
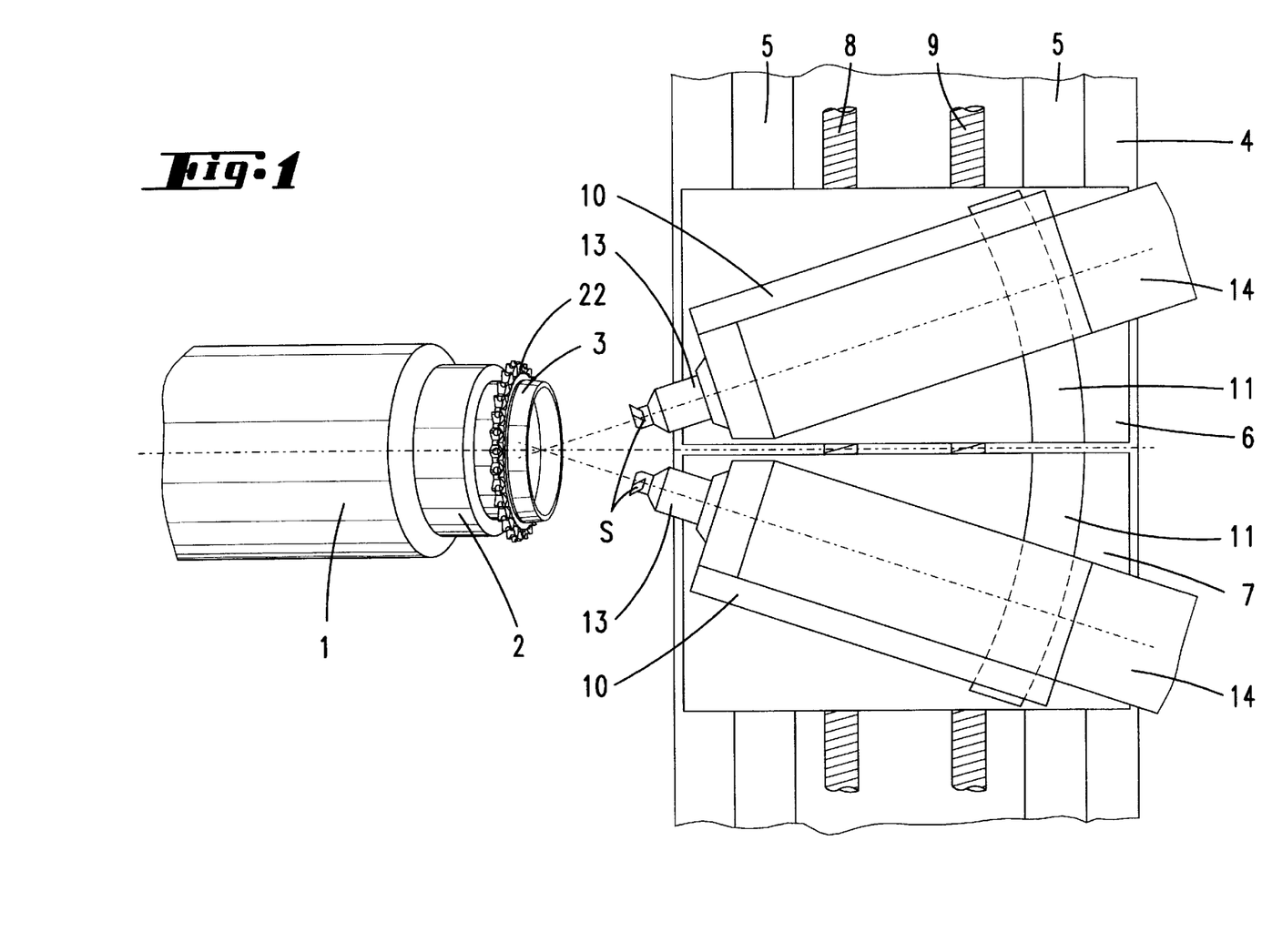
FIG. 1 shows a simplified schematic diagram of the machine tool in the vicinity of the workpiece spindle and tool spindles.
Figure 2:
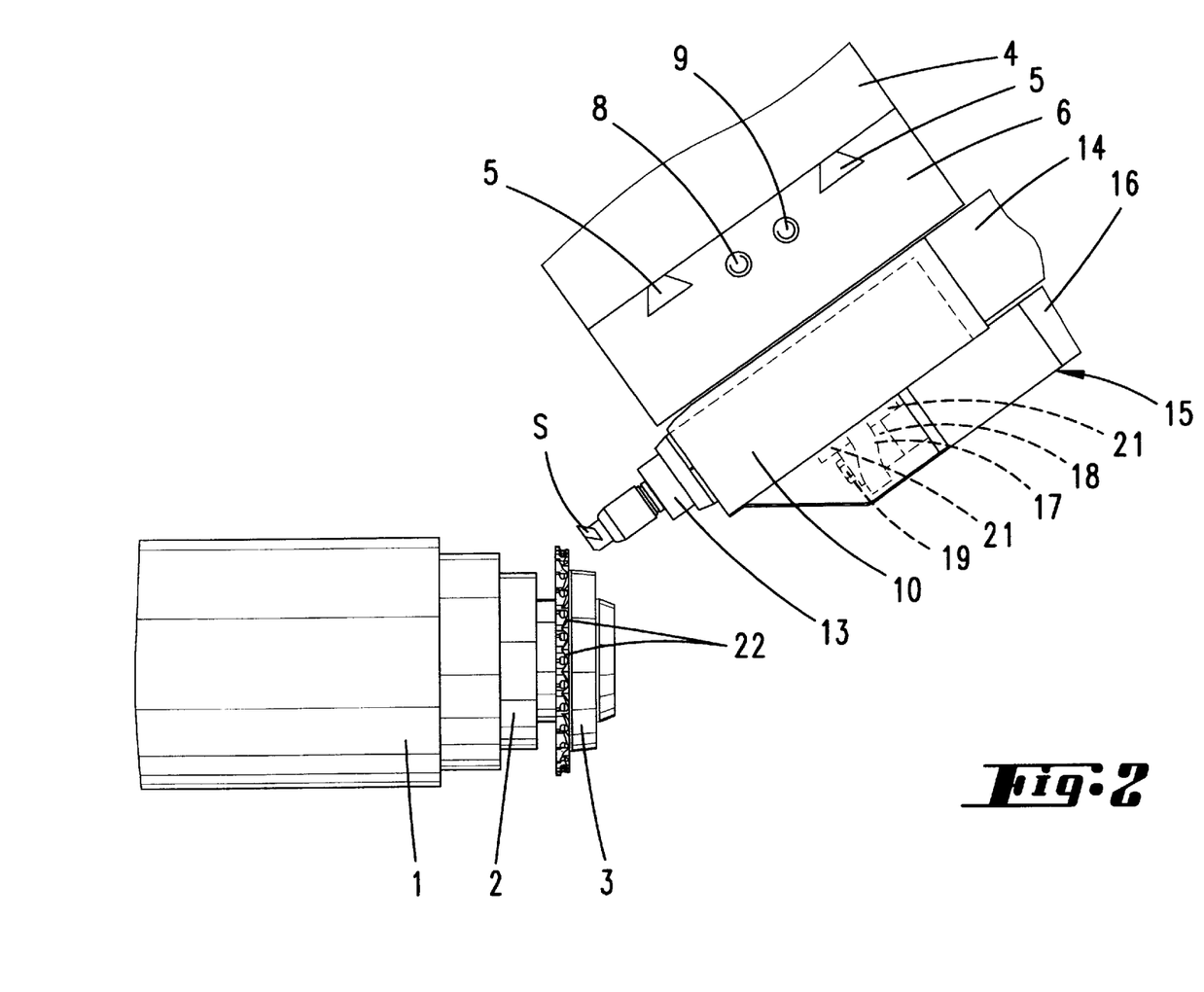
FIG. 2 is a top view of FIG. 1.

The machine tool has a workpiece spindle 1 that can be caused to rotate by a drive, not shown, with a chuck 2 for clamping a workpiece 3 in the form of a gear. Workpiece spindle 1 is aligned horizontally.

In addition, the machine tool has a vertical stand 4 with vertical guides 5 for two tool supports 6 and 7 located one above the other. They are adjusted heightwise by vertically aligned threaded spindles 8, 9. Preferably a measure is adopted such that tool supports 6, 7 can be adjusted independently of one another.

Each tool support 6, 7 holds one spindle housing 10, said housing cooperating with a curved guide 11 of tool support 6, 7. A carriage 12 is guided axially displaceably in spindle housing 10, said carriage in turn receiving a rotationally driven tool spindle 13. By means of a drive motor 14, tool spindle 13, carrying one fly cutter S, can be caused to rotate. The drive connection between tool spindle 13 and the drive motor is preferably made by a spline shaft coupling, not shown.

Figure 5:
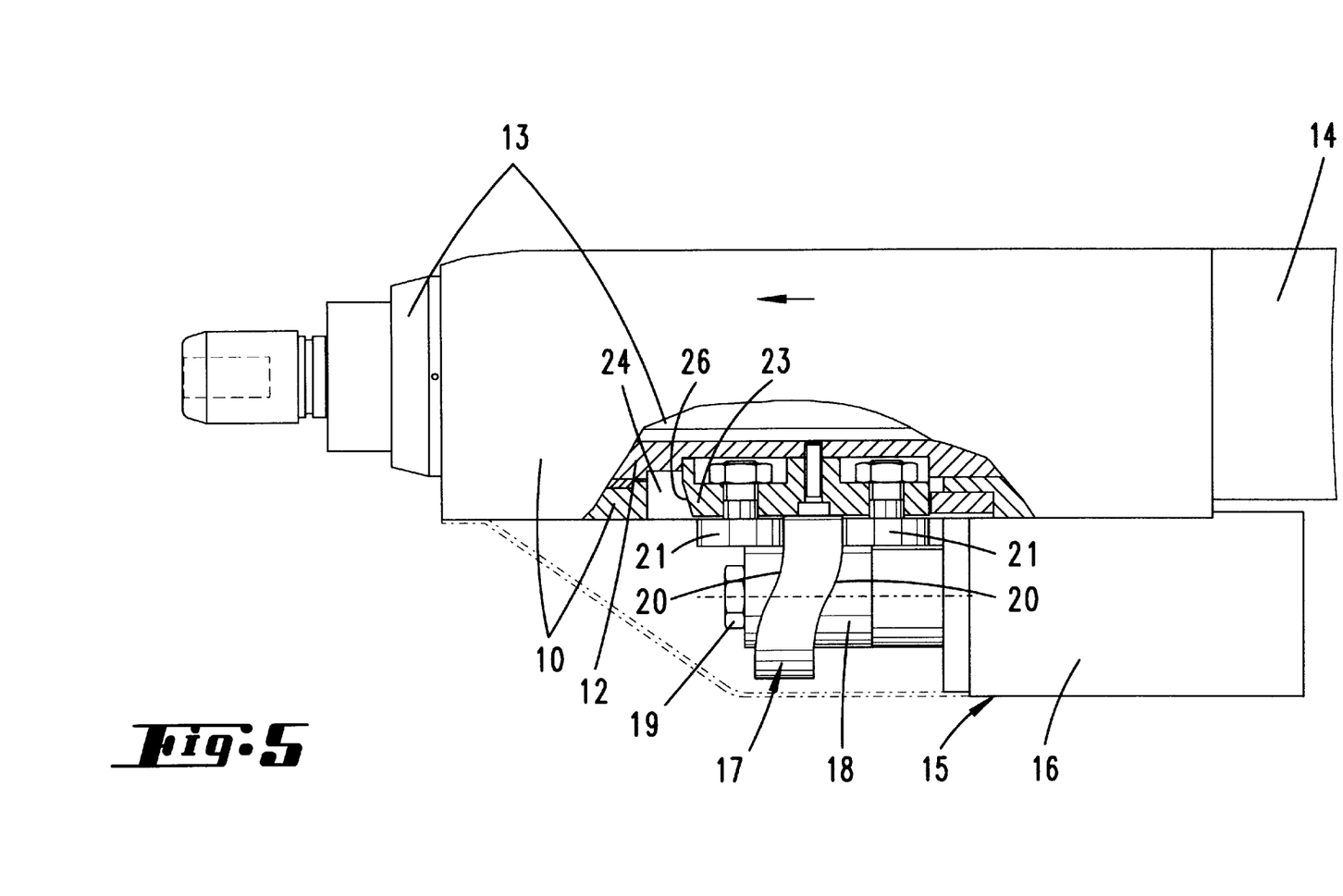
FIG. 5 is a detailed view of the tool spindle with the carriage in the position in which it has been moved backward by the axial displacement drive.
Figure 6:
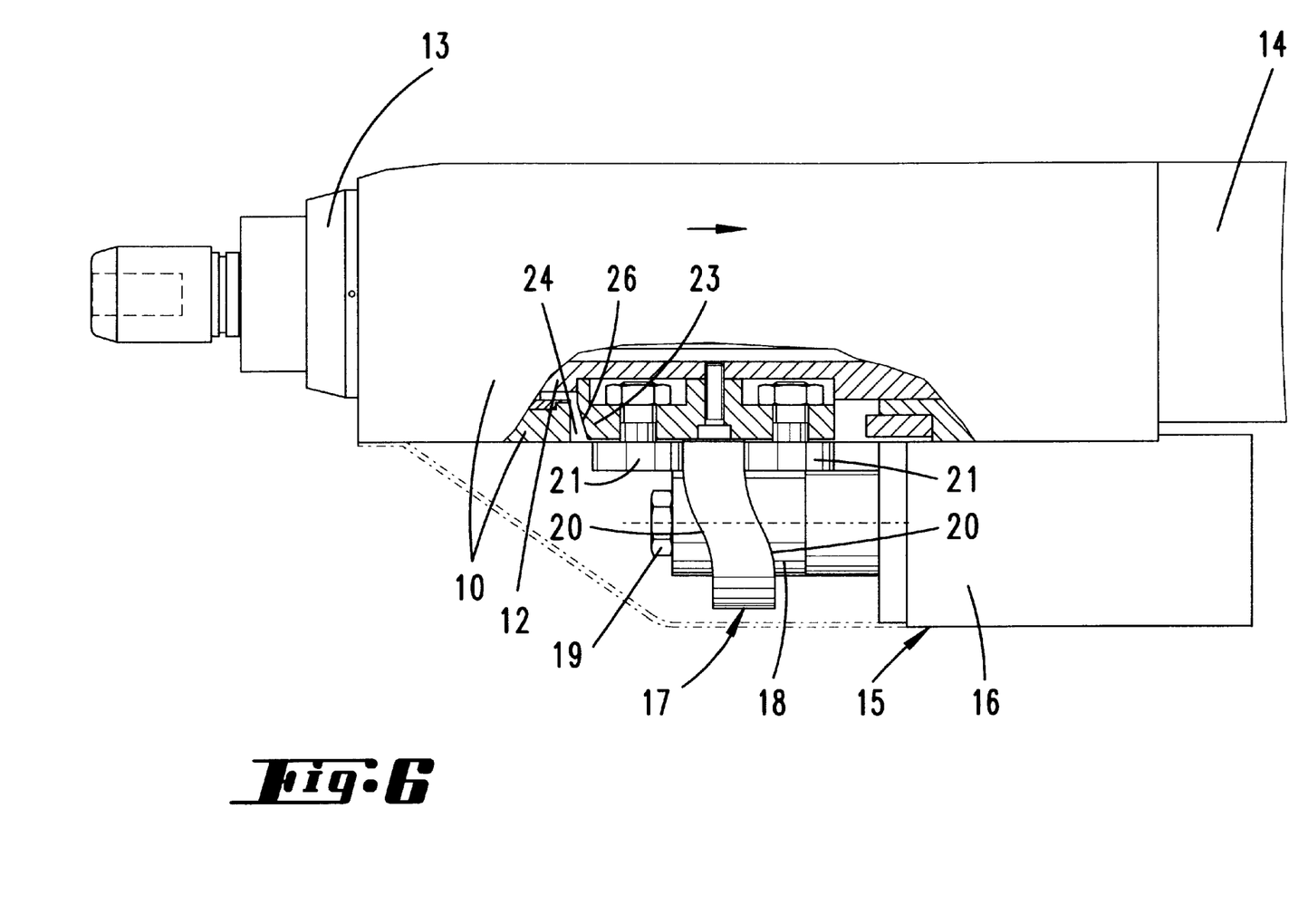
FIG. 6 is a view similar to FIG. 5 but with the tool spindle advanced.

An axial displacement drive 15 is also mounted on spindle housing 10. Its motor 16 serves to drive an axial radial cam 17. In detail, this cam has a sleeve-shaped hub 18 which serves to support axial radial cam 17. The axial radial cam can be slid on and secured by means of a tightening bolt 19 so that a nonrotatable connection is formed between the shaft of motor 16 and cam 17. Flanks 20 of the axial radial cam are located with zero play between two sensing rollers 21 of carriage 12 so that rotational displacement of the axial radial cam 17 results in a reciprocating movement of carriage 12 and hence of tool spindle 13. According to FIG. 5, axial radial cam 17 is in the position corresponding to the retracted position of carriage 12.

Figure 3:
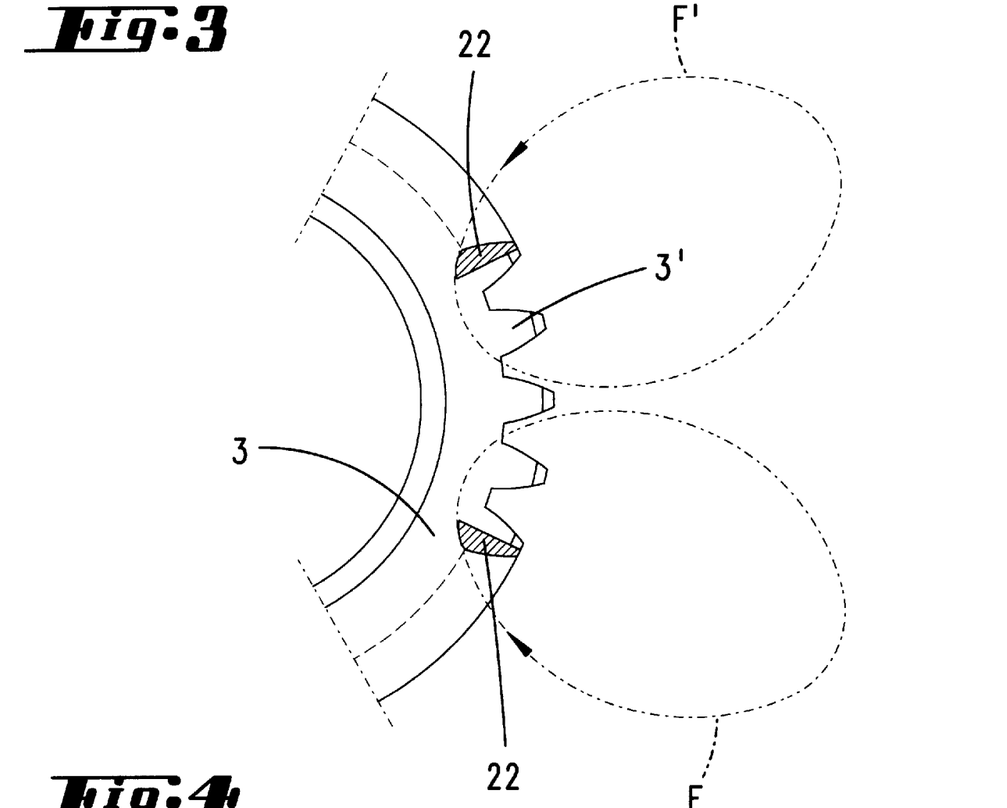
FIG. 3 is a section of a gear in which slopes have been produced on the tooth flanks by means of the tools.
Figure 4:
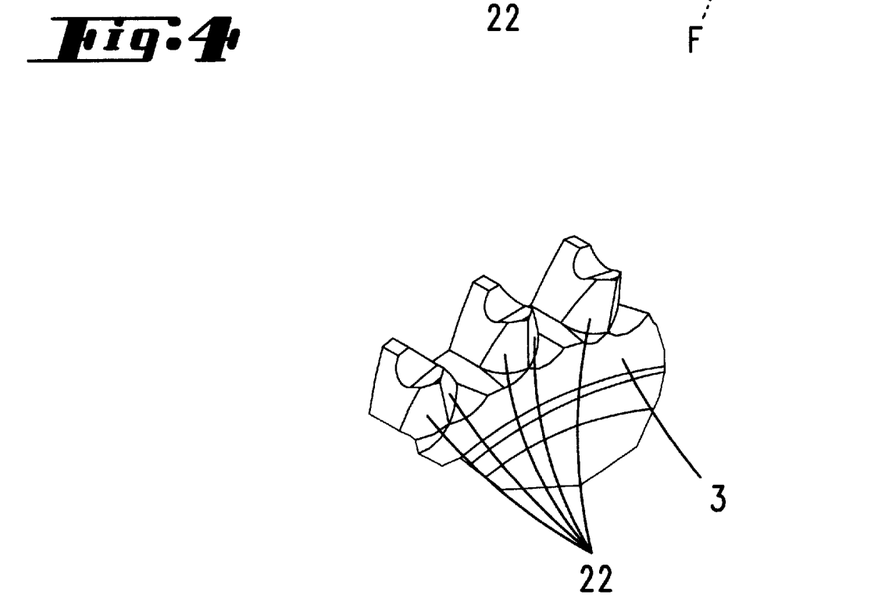
FIG. 4 is a perspective view of a section of the workpiece with the flanks finished.
Figure 8:
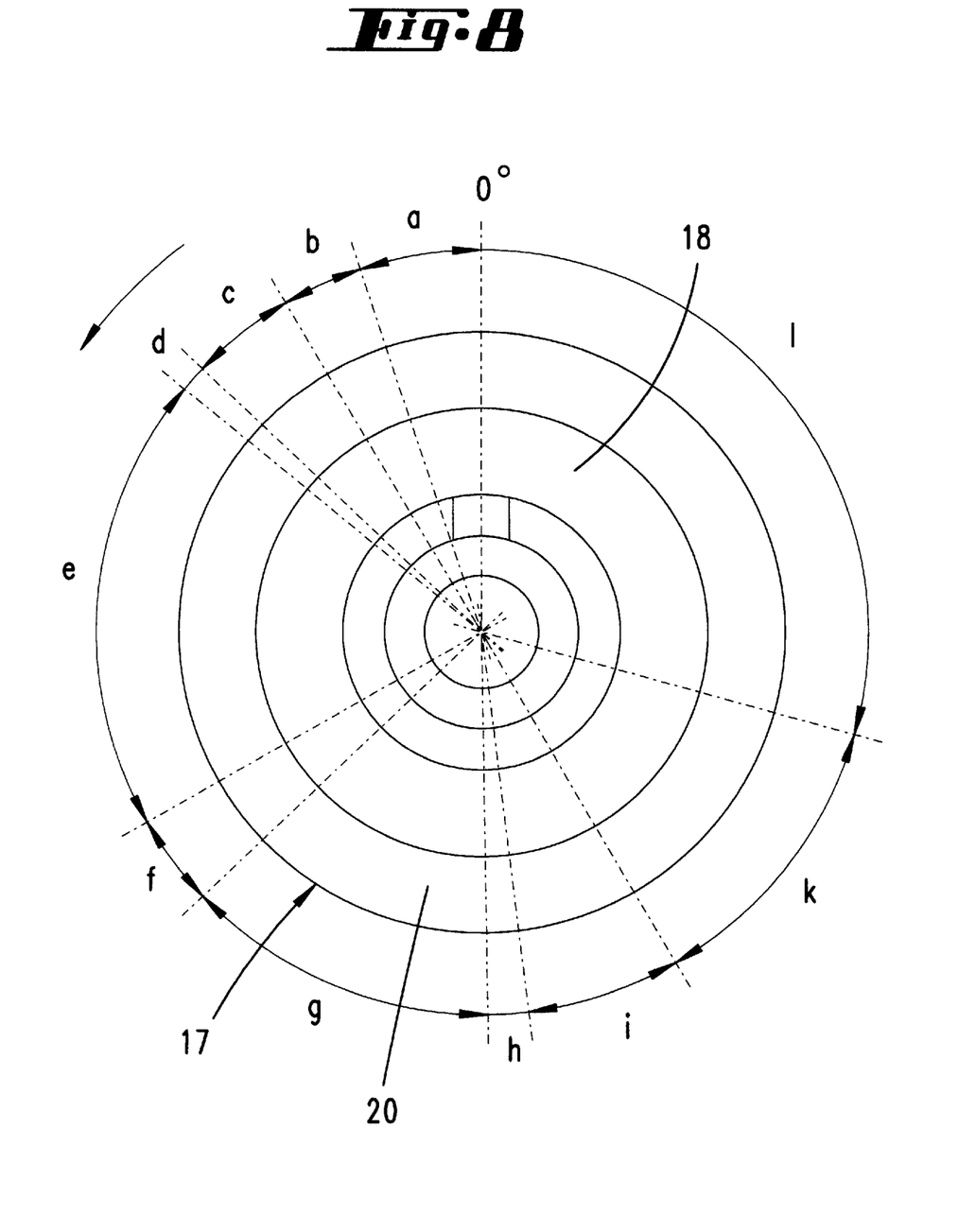
FIG. 8 is an end view of the axial radial cam, showing the individual cam sections.
Figure 9:
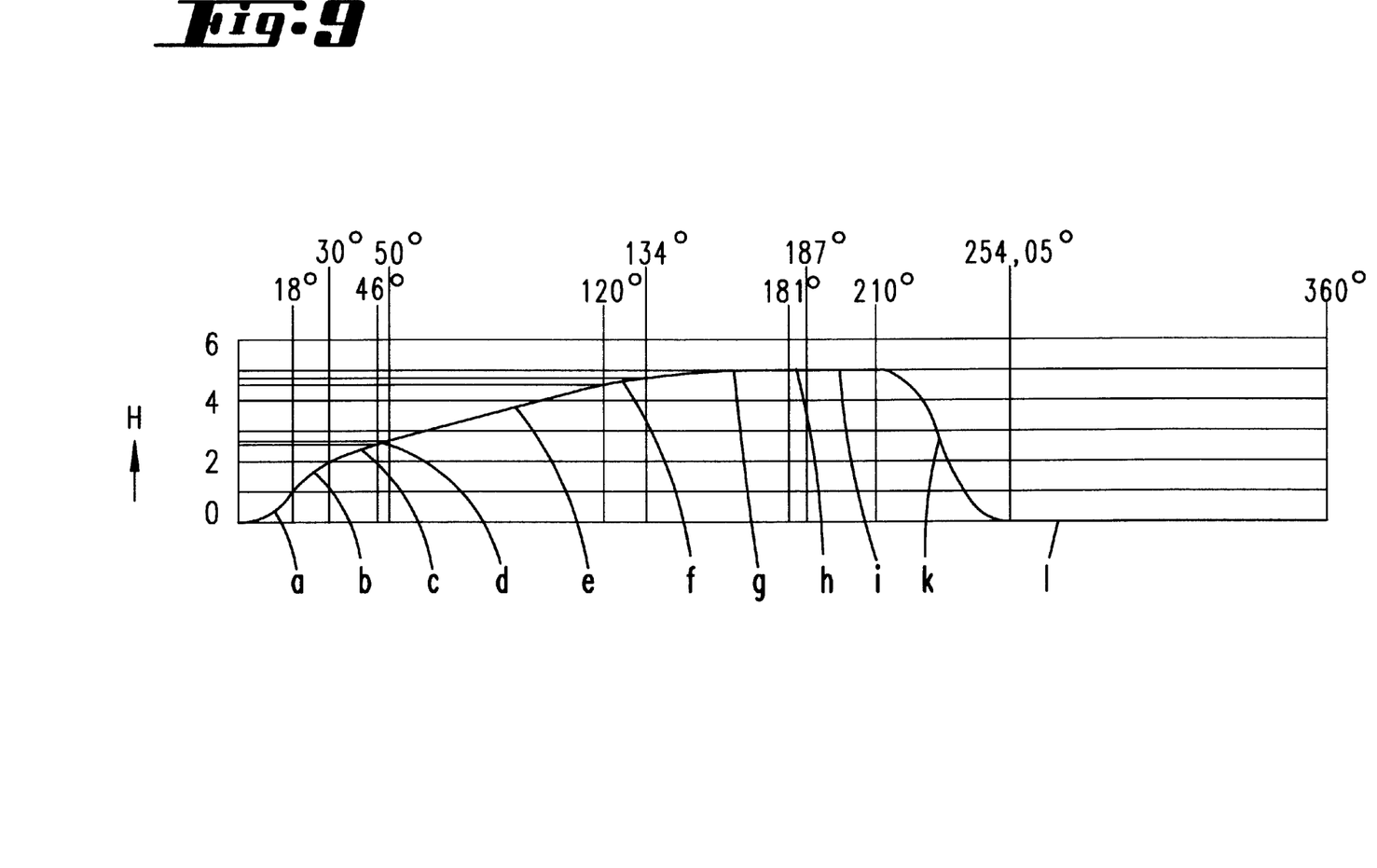
FIG. 9 shows a development of the cam.

Sensing rollers 21 abut flanks 20 of axial radial cam 17 at 0°. It is apparent especially from the development of the flank pattern in FIG. 9 and the degrees according to FIG. 8 that curve sections a-1 that abut one another have different approaches. Beginning at 0°, flanks 20 show a slowly rising pattern, with said area remaining at a constant height from 180 to 210°. In the embodiment, this corresponds to a tool feed H of about 5 mm during chip removal. In the range from 180–210°, precision machining takes place, in other words without any feed. Then the flank pattern drops sharply between 210° and 254.05°. It is evident from this that during chip removal in cyclic operation the tool feed is set relatively high relative to the rearward displacement of tool spindle 13. When working with cyclic operation, the cyclic drive of the workpiece and motor 16 of the axial displacement drive are synchronized. During such cyclic machining, as many as 240 strokes a minute can be produced by axial displacement drive 15, so that slopes 22 can be produced in a short time on tooth flanks 23 of a gear. Fly cutters S move along a flight path F, F' shown in FIG. 3 such that each of fly cutters S produces one slope on a tooth flank.

Figure 7:
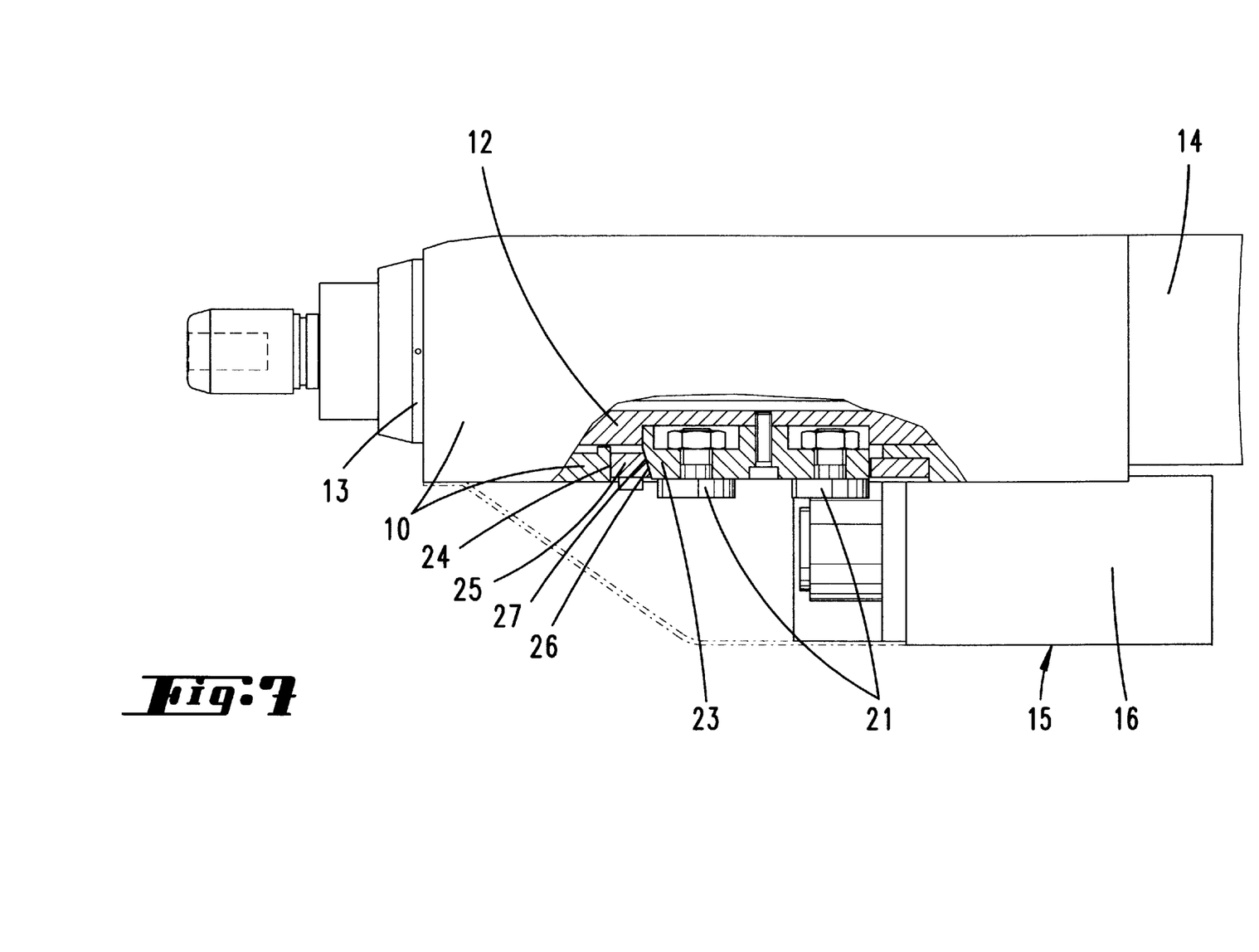
FIG. 7 is a view similar to FIG. 5, with the carriage being locked by a wedge to prevent axial displacement with the tool spindle in the retracted position.

If rotary operation of the machine tool is desired, in other words a synchronous rotation of workpiece 3 and tool spindle 13, cam 17 is removed after loosening tightening bolt 19. This is accomplished with carriage 12 in the retracted position. Then a wedge 25 is inserted between the coupling part 23 that supports sensing rollers 21 and the remaining space 24 up to spindle housing 10 and is tightened, securing carriage 12 in its retracted position. For this purpose, coupling 23 has a flank 26 that is beveled and faces space 24, said flank cooperating with the facing face 27 of wedge 25.

The embodiment shows that the cam 17 of tool spindle 13 allows a stroke of about 5 mm. However, cams can also be used that produce a shorter or longer stroke of the carriage and/or tool spindle.

We claim:

1. Machine tool for sloping tooth flanks of a gear, with two slopes being milled simultaneously, comprising a rotationally driven workpiece support and two rotationally driven tool spindles that are advanceable toward the workpiece along their axes, the angular alignment of the tool spindles relative to a workpiece axis being adjustable to receive one milling cutter each, the workpiece being selectively rotationally driven cyclically or continuously and the tool spindles being advanceable or retractable axially in synchronization with workpiece cycle or rotating in a fixed axial position in synchronization with continuous workpiece rotation, the workpiece being advanced in the axial direction, and a carriage being associated with each tool spindle, an axial displacement drive, said carriage being displaceable by said axial displacement drive, an axial radial cam, tool feed during chip removal being determined by the shape of said axial radial cam (17), said cam being replaceably mounted and rotationally driven by said axial displacement drive (15), a stroke (H) of the cam corresponding at least to chip removal distance, and two flanks (20) of the axial radial cam (17) being located between sensing rollers (21) of said carriage (12) with zero play.

2. Machine tool according to claim 1, further comprising a wedge, and said carriage (12) is securable against axial displacement in its advanced or retracted position by means of said wedge (25).

3. Machine tool according to claim 1, wherein the cam (17) of said axial displacement drive (15) rotates at an essentially constant rotational speed in synchronization with the workpiece cycle, with feed being determined by the cam (17).

4. Machine tool according to claim 1, wherein said tool spindles (13) are retracted more rapidly than said tool spindles are advanced.

5. Machine tool according to claim 1, wherein the milling cutter is a face cutter.

6. Machine tool according to claim 1, wherein the milling cutter is a one-tooth fly cutter.

* * * * *